J. T. CAMP.
Animal Poke.
No. 224,140.  Patented Feb. 3, 1880.
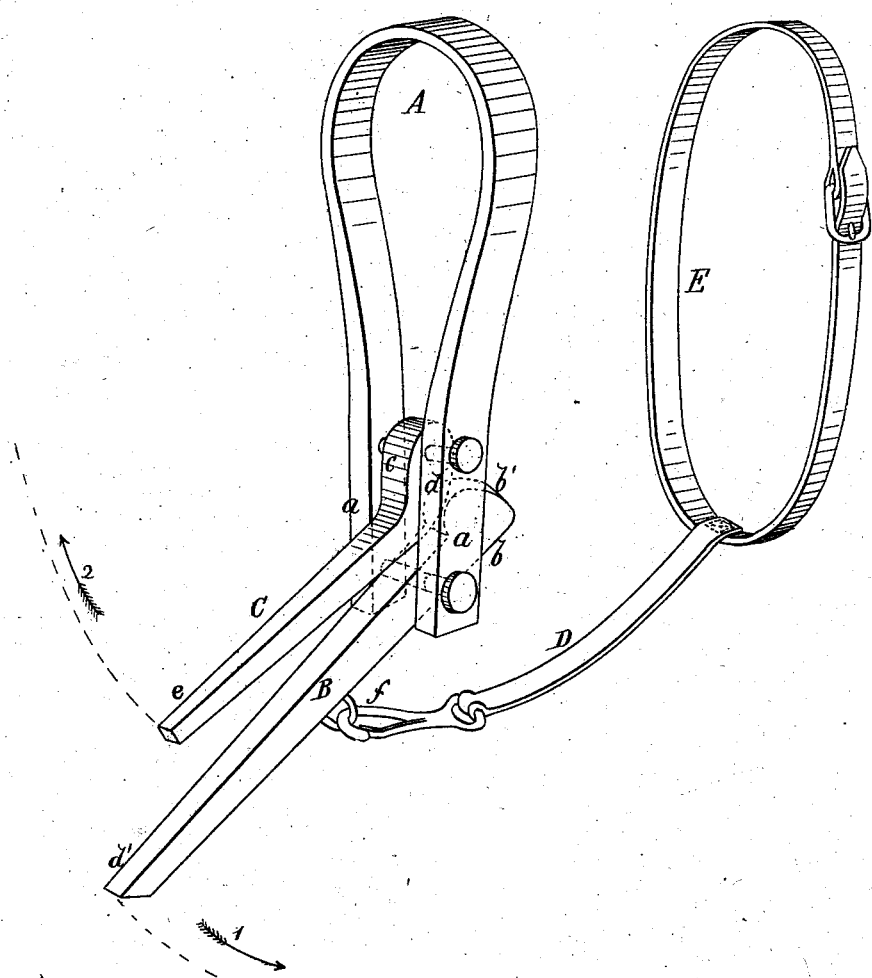
WITNESSES:
Henry N. Miller
C. Sedgwick
INVENTOR:
J. T. Camp
BY Munn &Co
ATTORNEYS.

United States Patent Office.

JAMES T. CAMP, OF LA FAYETTE, OHIO.

ANIMAL-POKE.

SPECIFICATION forming part of Letters Patent No. 224,140, dated February 3, 1880.

Application filed November 14, 1879.

*To all whom it may concern:*

Be it known that I, JAMES T. CAMP, of La Fayette, in the county of Allen and State of Ohio, have invented a new and Improved Animal-Poke, of which the following is a specification.

The object of my invention is to prevent horses and other animals from jumping fences.

The invention consists of a bow to place over the animal's neck, in which bow are pivoted the ends of two bars, one above the other. The pivoted ends of the bars are provided with cams, so arranged that by pressure on the lower bar the poke is spread open. The free end of the lower bar, when it is drawn down, throws the free end of the upper bar up against the head of the animal.

In the accompanying drawing a perspective view of my improvement is shown.

Referring to the drawing, A is the bow of the poke, B is the lower bar, and C is the upper bar, pivoted at one end between the ends $a\ a$ of the bow. Back of the pivoted connecttion of the bar B with the bow the pivoted end $b$ of said bar is provided with a cam, $b'$, on its upper side, and the pivoted end $c$ of bar C is likewise provided with a cam, $d$, on its under side. Said cam $d$ is held in front of and in contact with cam $b'$, as shown in the drawing. The lower bar, B, it will be observed, is longer than the upper bar, C.

The bow A is fastened around the animal's neck, so that the bars B C will hang under the neck and head.

When an animal wearing the poke approaches a fence with the intention of jumping it and strikes the fence with the free end $d'$ of the lower bar, B, this end $d'$ is forced down in the direction of arrow 1, and the cam $b'$, acting against the cam $d$ of upper bar, C, turns this bar on its pivot and throws the free end $e$ of said bar, in the direction of arrow 2, against the animal's head. This deters the animal from further attempts to jump the fence.

The animal might attempt to throw the lower bar, B, on top of the fence to prevent it from operating the upper bar. To hinder this I connect the lower bar, B, by means of a snap-hook, $f$, with one end of a strap, D, the opposite end whereof is attached to a surcingle, E. The surcingle is buckled around the animal's body, and the strap D is carried between his fore legs and hooked to lower bar, B, in the manner shown in the drawing. This arrangement prevents the animal from throwing the lower bar, B, on top of the fence, whereby the said bar is at all times retained in position to operate the upper bar, C, for the purpose specified.

Having thus described my invention, I claim as new and desire to secure by Letters Patent—

As an improvement in animal-pokes, the combination, with the bow A, of the bars B C, respectively provided with cams $b'\ d$, substantially in the manner described.

JAMES TUCKER CAMP.

Witnesses:
J. D. FOYE,
H. K. FREDRICKS.